(12) United States Patent
Tan et al.

(10) Patent No.: US 9,510,022 B2
(45) Date of Patent: Nov. 29, 2016

(54) MULTI-LAYER APPROACH FOR FRAME-MISSING CONCEALMENT IN A VIDEO DECODER

(71) Applicant: Intel Corporation, Santa Clara, CA (US)

(72) Inventors: Mizhou Tan, Basking Ridge, NJ (US); Bahman Barazesh, Flemington, NJ (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 13/712,391

(22) Filed: Dec. 12, 2012

(65) Prior Publication Data

US 2014/0161198 A1   Jun. 12, 2014

(51) Int. Cl.
*H04N 7/26* (2006.01)
*H04N 19/895* (2014.01)

(52) U.S. Cl.
CPC .................................. *H04N 19/895* (2014.11)

(58) Field of Classification Search
None
See application file for complete search history.

(56) References Cited

U.S. PATENT DOCUMENTS

| | | | |
|---|---|---|---|
| 5,838,265 A | 11/1998 | Adolph | |
| 6,141,385 A | 10/2000 | Yamaji | |
| 6,370,193 B1 | 4/2002 | Lee | |
| 7,894,521 B2 | 2/2011 | Hannuksela | |
| 7,916,796 B2 | 3/2011 | Yan | |
| 2002/0181600 A1* | 12/2002 | Matsuura et al. | 375/240.27 |
| 2004/0008781 A1* | 1/2004 | Porter et al. | 375/240.16 |
| 2006/0050786 A1* | 3/2006 | Tanizawa et al. | 375/240.03 |
| 2007/0058635 A1* | 3/2007 | DaCosta | 370/394 |
| 2008/0301538 A1 | 12/2008 | Wang et al. | |
| 2008/0316362 A1* | 12/2008 | Qiu | H04N 19/159 348/607 |
| 2009/0232214 A1* | 9/2009 | Ghanbari | 375/240.16 |
| 2009/0304081 A1* | 12/2009 | Bourge | 375/240.15 |
| 2010/0037281 A1 | 2/2010 | Bennett | |
| 2010/0158130 A1* | 6/2010 | Chen et al. | 375/240.25 |
| 2010/0303154 A1 | 12/2010 | Le Floch et al. | |
| 2011/0085592 A1 | 4/2011 | Chang et al. | |
| 2011/0188766 A1 | 8/2011 | Nassor et al. | |
| 2014/0098898 A1* | 4/2014 | Noru et al. | 375/240.27 |

FOREIGN PATENT DOCUMENTS

WO   WO 2009/002310   * 12/2008

* cited by examiner

*Primary Examiner* — Frederick Bailey
(74) *Attorney, Agent, or Firm* — Green, Howard & Mughal LLP

(57) ABSTRACT

The invention relates to a method of concealing errors attributed to missing frames in a Motion Picture Expert Group-2 video stream, including the steps of: receiving a new frame for decoding and a "frame missing" flag that is set to a value associated with the occurrence of a missing frame, parsing the new frame to recover a picture type and a frame structure of the new frame, retrieving a picture type and a frame structure of a previous frame decoded immediately prior to the new frame, assigning a picture type and a frame structure to the missing frame based on the picture type and frame-structure values of the previous frame and the new frame and then applying an error concealment technique based upon the assigned picture type and frame structure of the missing frame.

11 Claims, 8 Drawing Sheets

MULTI-LAYER APPROACH FOR FRAME-MISSING CONCEALMENT IN A VIDEO DECODER

FIELD OF THE INVENTION

The invention relates to decoding of a video stream and for providing concealment of errors in the presence of missing frames within the video stream.

BACKGROUND

Typical video coding methods, to one degree or another, serve to reduce redundancies within a video sequence at the risk of introducing loss in the quality of the decoded video. Additionally, the resulting compressed bit stream is much more sensitive to bit errors. When transmitting the compressed video bit stream in an error-prone environment, such as the IP network, the decoder at the receive end of the communication link needs to be resilient in its ability to handle and mitigate the effects of these bit errors.

The Motion Picture Expert Group (MPEG) video encoding standards have has been widely adopted to transmit compressed video signals over band-limited channels in various multimedia applications, such as digital video broadcasting, which uses the MPEG-2 standard. The MPEG-2 standard is published as part of the International Standards Organization (ISO)/International Electrotechnical Commission (IEC) publication 13818, which is herein incorporated by reference.

The loss of an MPEG-2 transport stream (TS) packet results in the loss of one slice, two slices, or the entire frame (if the lost packet included the frame header), depending on the type of TS packet. Without a proper error concealment algorithm, the video quality created by an MPEG-2 video decoder will be severely degraded. To date, efforts at concealing the loss of an entire frame in an MPEG-2 video stream have been limited.

SUMMARY

This Summary is provided to introduce a selection of concepts in a simplified form that are further described below in the Detailed Description and Claims. This Summary is not intended to identify key features or essential features of the claimed subject matter, nor is it intended to be used to limit the scope of the claimed subject matter.

The invention relates to a method of concealing errors attributed to missing frames in an MPEG-2 video stream, where the method as performed in an MPEG-2 video decoder includes the steps of: receiving a new frame for decoding and a "frame missing" flag that is set to a value associated with the occurrence of a missing frame, parsing the new frame to recover a picture type and a frame structure of the new frame, retrieving a picture type and a frame structure of a previous frame decoded immediately prior to the new frame, assigning a picture type and a frame structure to the missing frame based on the picture type and frame-structure values of the previous frame and the new frame and then applying an error concealment technique based upon the assigned picture type and frame structure of the missing frame.

Additional embodiments of the invention are described in the remainder of the application, including the claims.

BRIEF DESCRIPTION OF THE DRAWINGS

Embodiments of the present invention will become apparent from the following detailed description, the appended claims, and the accompanying drawings in which like reference numerals identify similar or identical elements.

DETAILED DESCRIPTION

Figure 1:
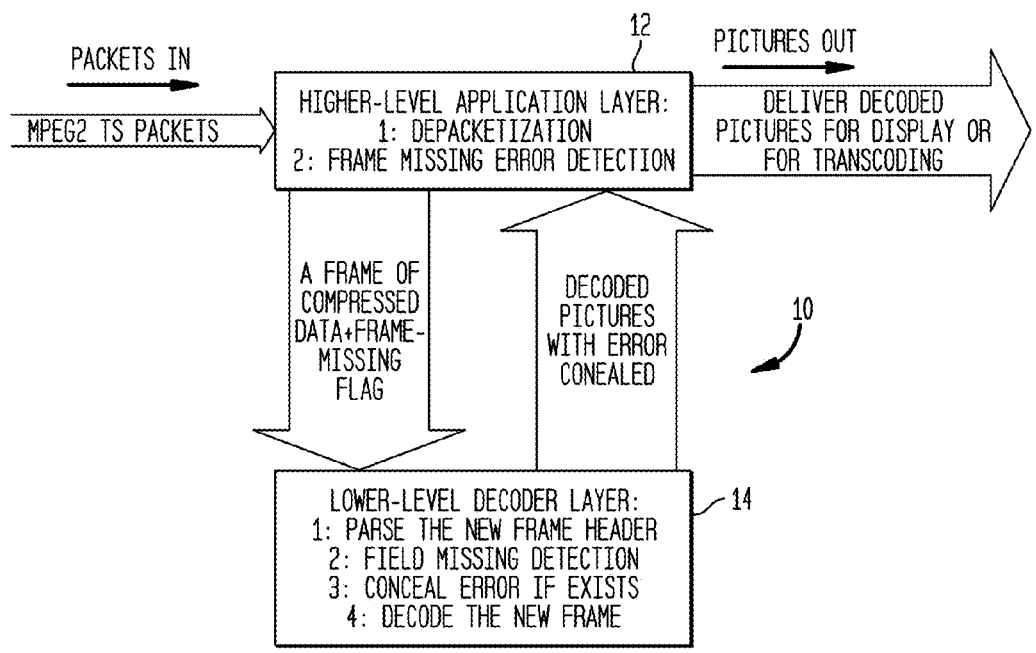
FIG. 1 is a simplified diagram showing the dual-layer approach for recognizing and concealing missing frames in an MPEG-2 video stream.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

Also for purposes of this description, the terms "couple", "coupling", "coupled", "connect", "connecting", or "connected" refer to any manner known in the art or later developed in which energy is allowed to be transferred between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise. Further, elements in a figure having subscripted reference numbers, (e.g., $100_1$, $100_2, \ldots 100_K$) might be collectively referred to herein using the reference number 100.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Video compression standards such as H.263, H.264, MPEG-1, MPEG-2, MPEG-4 and the like achieve efficient compression by reducing temporal redundancies between video frames, as well as spatial redundancies within a single video frame. For MPEG-2-based video streams in particular, the compressed data is packetized into relatively small units of equal size, defined as transport stream (TS) packets. At the receive end, a high-level application layer collects the arriving TS packets and organizes them to re-create the original frames. During this process, the application layer can reliably detect the occurrence of missing packets by checking for discontinuities in the Presentation Time Stamp (PTS), a clock-based synchronous parameter residing in the Packetized Element Stream (PES) packet layer.

If the application layer further determines that a missing packet contains information required for proper reconstruction of the current frame (such as, for example, picture header information), the frame might be discarded without any attempts to conceal its absence from the recreated video stream. In accordance with one embodiment of the present invention, information regarding the occurrence of a discarded frame is passed along to the decoder performing the actual reconstruction of the data (for example, as a "frame missing" flag), where this information is used in conjunction with information known about other frames to provide concealment of this discarded frame in the recovered video stream.

As will be described in detail below, the methodology of the present invention utilizes "frame missing" information from the high-level application layer in conjunction with parameters of MPEG-2 encoding in the low-level decoder layer to perform frame-missing error concealment. In particular, the "picture type" (I, P or B) as described below in association with FIG. 2 and the "structure" (field vs. frame) parameters as described below in association with FIG. 3 are used in a video decoder of one embodiment of the present invention to recognize the presence of a missing frame and re-create parameter values for this missing frame to provide a degree of concealment in the video stream.

The "picture type" parameter of an MPEG-2 frame defines the type of information used to encode the video data of that current frame. As will be explained in detail below, an I-type frame does not use any information from other frames in the encoding process, where in contrast a P-type frame uses information from a previous frame to perform encoding. A B-type frame uses information from both a previous frame and a "future" frame to perform encoding.

The "structure" parameter of an MPEG-2 frame is defined as either "frame structure" or "field structure". In the "frame structure" configuration, all of the information for recreating a video image is contained within a single encoded frame. For "field structure", the information from an initial frame is divided into two encoded frames—one containing the even-numbered pixel lines, and another containing the odd-numbered pixel lines. At times, this pair of frames is referred to in the art as a "top-field" frame and a "bottom-field" frame, respectively. In the case of field structure encoding, both the top-field and bottom-field frames are necessary to faithfully recreate the original video image.

Reference is made to FIG. 1, which is a high-level block diagram illustrating the concepts involved in frame-missing error concealment in accordance with an exemplary embodiment of the present invention. As shown, fixed-sized MPEG-2 transport stream (TS) packets are received at a high-level application layer 12 of an MPEG-2 video receiver 10. Application layer 12 functions in the manner described above to parse the received TS packets to retrieve the raw, compressed video data. Application layer 12 re-orders any out-of-order packets and prepares a frame of compressed data which is then sent to a low-level decoder layer 14. Decoder layer 14 uses a programmed logic sequence to recover the original data (as a function of the determined frame parameters, "picture type" and "frame structure") from the compressed version.

During the parsing, application layer 12 can detect the possibility of a missing packet by recognizing a discontinuity in the Presentation Time Stamps (PTS) used to re-order the packets. Upon further review, if application layer 12 determines that the missing packet contains information required for data reconstruction (e.g., picture header information), it may discard the current frame and send a "frame missing" flag to low-level decoder layer 14. This flag, in one embodiment, is sent to decoder layer 14 along with the next (complete) frame that is ready to be decoded (hereinafter referred to as the "new frame").

Upon receiving this "frame missing" information, decoder layer 14 first retrieves picture header information from the new frame and uses this information, in conjunction with the presence of the "frame missing" flag and the information of previously-decoded frames (held in memory in decoder layer 14, for example), to determine a preferred process for handling error concealment for the missing frame. This process will be described in detail below and, as mentioned above, is a function of both the "picture type" (I, B, P) of the previous and new frames, as well as their structure (frame vs. field).

Prior to describing the methodology of the present invention in detail, it is considered useful to review and define the parameters involved in MPEG-2 decoding that are used to detect, define and conceal missing frames in an MPEG-2 encoded stream in accordance with one embodiment of the present invention.

Figure 2:
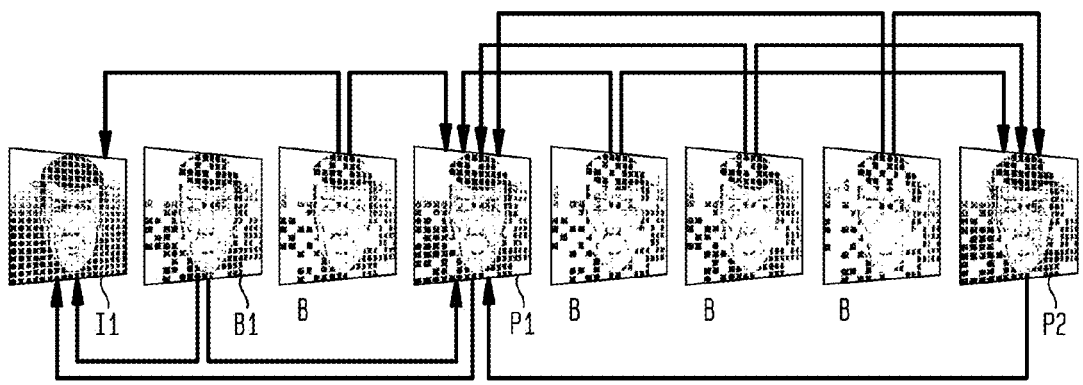
FIG. 2 illustrates a typical stream of MPEG-2 frames, showing I-type, P-type and B-type frames.
Figure 3:
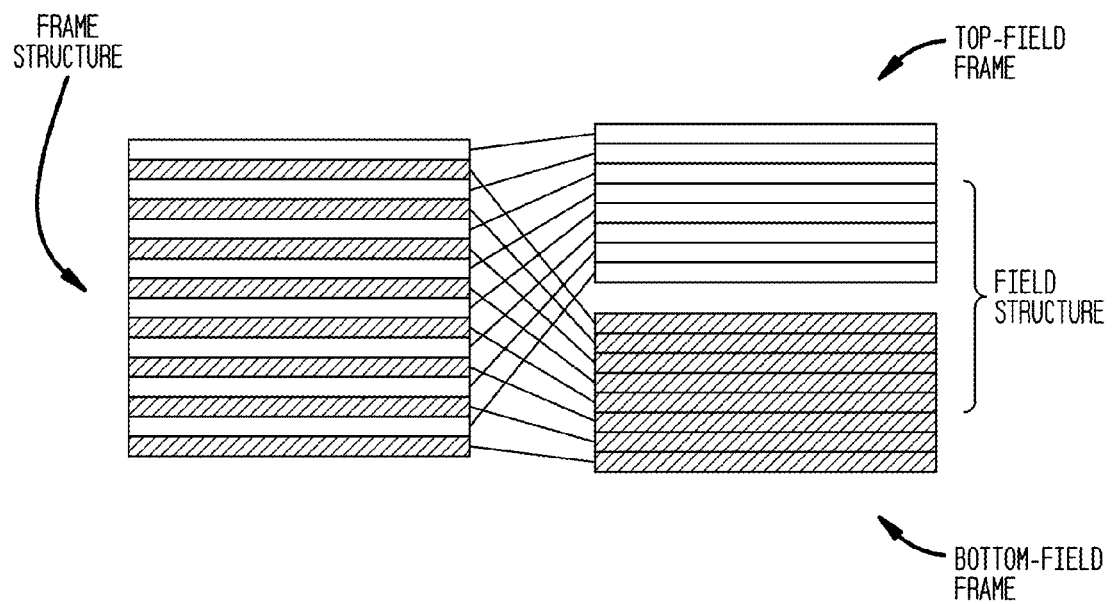
FIG. 3 illustrates both a frame-structure frame and a field-structure frame.

FIG. 2 illustrates an exemplary sequence of MPEG-2 frames, showing frames of each type, namely, I, B and P, where this sequence shows the frames in their "display" order (which is different than the "decoding" order, as described below). An intra-coded frame (i.e., an I-type frame) is defined as a frame where the video data within that frame is encoded independently of any other frames (that is, without any reference to the video data occurring in frames either before or after the I-type frame). These I-type frames are thus considered as reference points, and any error propagation due to transmission errors in previous frames will be terminated upon reception of an I-type frame.

A predictive-coded frame, referred to as a P-type frame, utilizes encoding that is based upon a previous I-type or P-type frame (whichever is closer in time). The "new" P-type frame needs to encode only the difference between the video data of the "new" P-frame and the prior I- or P-type frame, so the encoding is more compressed than possible with the I-type frame. With reference to FIG. 2, a P-type frame P1 is shown as using the information of the previous I-type frame I1 to perform encoding. Similarly, a P-type frame P2 is shown as using the information of previous frame P1 to provide encoding for frame P2.

Even more compressed is a bidirectional, predictive-coded frame, referred to as a B-type frame, which is encoded based upon a previous I- or P-type frame as well as the "next" I- or P-type frame. FIG. 2 shows a first B-type frame B1, which uses information from both frame I1 and frame P1 to properly encode its picture information. In the standard nomenclature, the I1 frame is defined as the "forward-reference" (previous) frame and the P1 frame is defined as the "backward-reference" (future) frame. The arrows in FIG. 2 are intended to show the interdependence of these P-type and B-type frames upon other frames in the sequence to provide error-free decoding.

It is to be noted that in the presence of B-type frames, the decoding order and the display order will be different. For example and with respect to the diagram of FIG. 2, to properly decode the B1 frame, both the I1 frame and the P1 frame are first decoded. The frames are thus processed within decoder layer 14 in a "decoder" order where the P1 frame is decoded before the B1 frame. After decoding, the frames are re-ordered into a "display" order (that is, the order as shown in FIG. 2), where this re-ordering may take place within decoder layer 14 or in another module of MPEG-2 video receiver 10.

As also mentioned above, MPEG-2 frames are encoded in one of two different structures, defined as "frame structure" or "field structure". FIG. 3 illustrates both of these structures. As shown, a "frame structure" MPEG-2 frame represents a complete encoded picture, while the "field structure" utilizes two separate, adjacent frames to present the same encoded picture. Also referred to as "interlaced", a field-structure-encoded picture separates the pixel lines so that every other line in the original frame is used to form a field-structure frame, as shown in FIG. 3. A field-structure frame that includes the top-most pixel line is defined as the "top-field" frame, and the remaining frame that includes the bottom-most pixel line is defined as the "bottom-field" frame.

Figure 8:
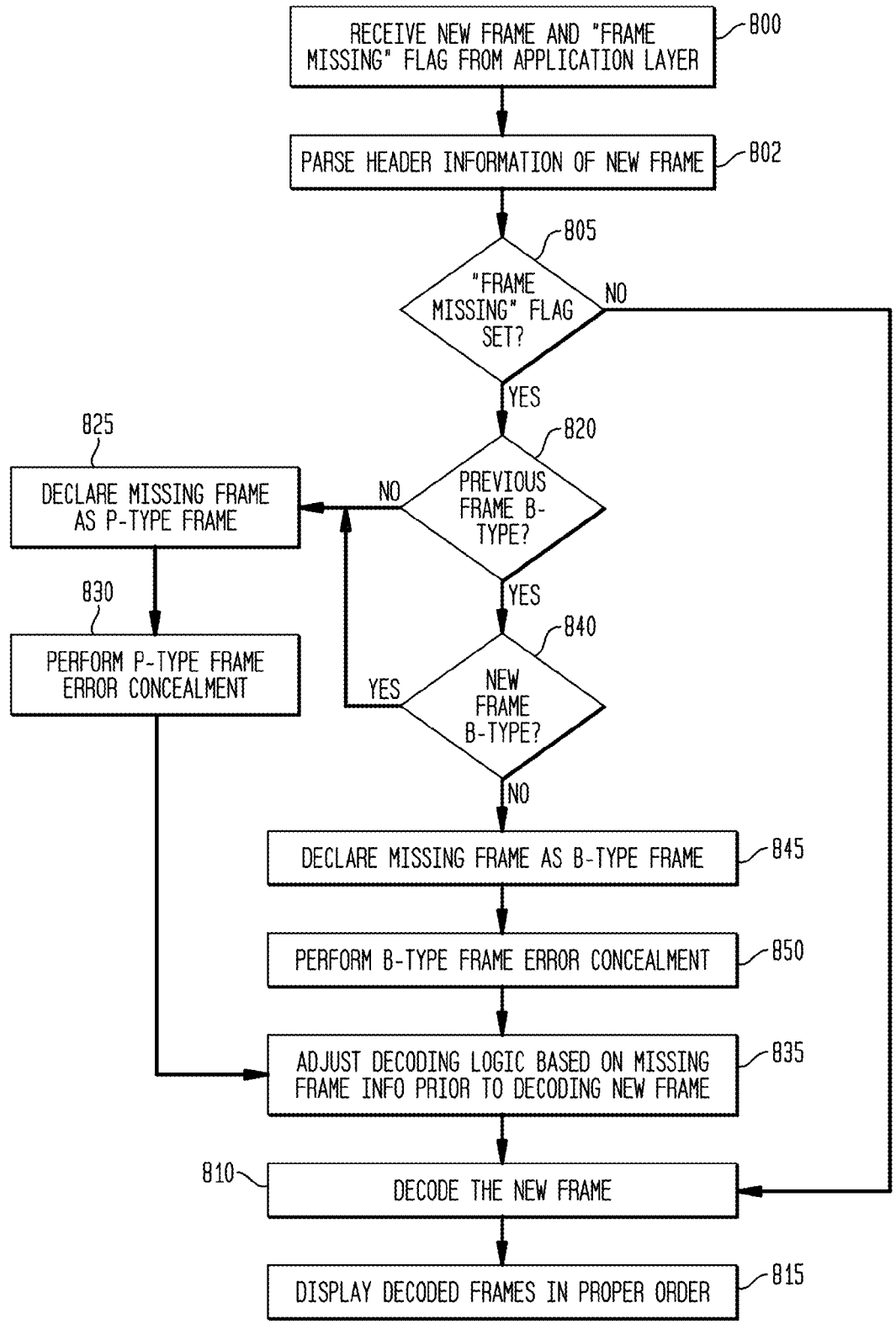
FIG. 8 is a flowchart of an alternative method of the present invention, for use with a progressive MPEG-2 video stream.

In some cases, all of the frames in a video stream exhibit the same structure, namely, the "frame" structure. This type of encoding is defined as "progressive", and discussed below in association with an embodiment of the present invention as shown in FIG. 8. When the field-structure format is used to represent a given picture, the two required frames will be presented in sequence as a pair, but in no fixed order. That is, either the top-field formatted frame or the bottom-field formatted frame may be received first by the decoder. In many situations, a typical MPEG-2 video stream will comprise both frame-structure frames and field-structure frames.

As will be discussed below, the ability to detect a missing field-structure frame is usually detected by decoder layer 14 (as opposed to application layer 12), after receiving at least one other field-structure frame. As a result, one embodiment of the present invention performs a query to check for a "second" frame missing of a pair of field-structure frames, regardless of the value of the "frame missing" flag generated by application layer 12.

With reference to FIG. 2, the following example illustrates the resulting impairment associated with a missing "backward reference" frame. As noted above, a B-type frame relies on two reference frames to perform its encoding, a "forward reference" I- or P-type frame (i.e., a past frame) and a "backward reference" I- or P-type frame (i.e., a future frame). Therefore, to properly decode a received B-type frame, both the "forward reference" frame and the "backward reference" frame must have already arrived and be available within decoder layer 14 (e.g., stored within a memory component of decoder layer 14). Thus, as discussed above, the decoding order will be different from the ultimate "display order" (the display order illustrated in FIG. 2), with the backward reference frame decoded prior to the current B-type frame, but displayed in its proper "time" position after the current B-type frame.

In the situation where this "backward reference" frame is missing, the decoder may erroneously use the "forward reference" frame as the backward frame, creating artifacts in the current B-type frame, as well as an incorrect display order. In another example, if the missing frame is a missing field-structure frame (and is either an I- or P-type frame), errors will continue to propagate through a number of frames, since half of the necessary pixel lines needed to recreate the current video image will be missing.

The methodology of the present invention, as outlined in the block diagram of FIG. 1 and described in association with the following flowcharts, addresses these and other issues by providing concealment of missing frames in an MPEG-2 video data stream.

Figure 4:
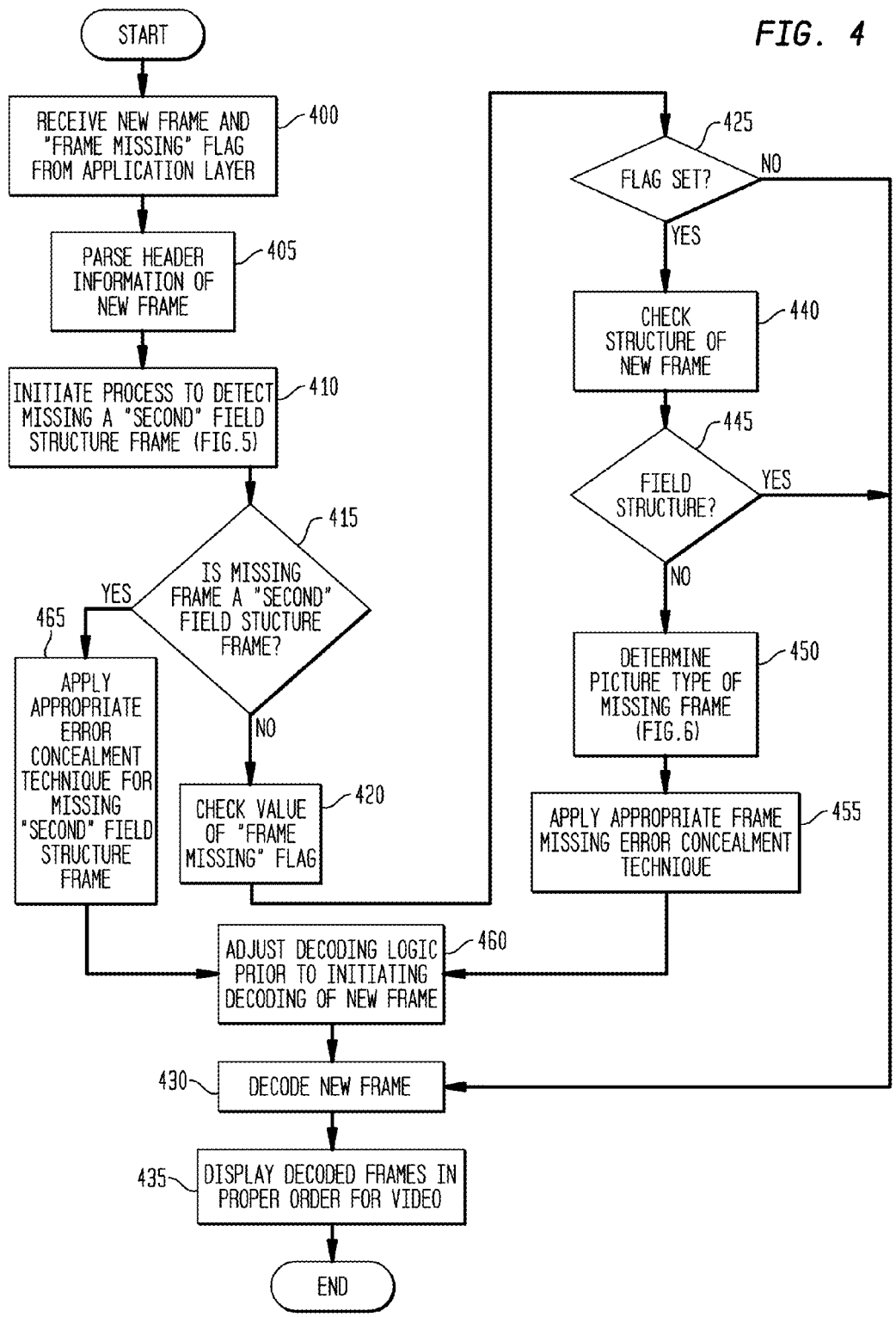
FIG. 4 is a flowchart of an exemplary method for recognizing and concealing missing frames in an MPEG-2 video stream.

FIG. 4 is a flowchart of an overall frame-missing error concealment methodology as proposed in one embodiment of the present invention. As shown, this exemplary process begins with decoder layer 14 receiving a new (compressed) frame, as well as a "frame missing" flag from application layer 12 of MPEG-2 video receiver 10 (step 400). It will be presumed that the flag will only be "set" when application layer 12 believes that a frame is "missing".

The process continues with decoder layer 14 parsing the header of the new frame (step 405) to retrieve both its picture type information (I, B or P) and its structure information (frame vs. field). Following this parsing, the process continues by determining if a "second" field-structure frame (of a pair of field-structure frames) is missing (step 410). The process for making this determination will be discussed in detail below in association with the flowchart of FIG. 5. For the purposes of the present discussion, it will be presumed that the outcome of this step is negative; that is, no "second" field structure frame is missing.

This outcome is then used by a following decision step (step 415). In the current scenario being described, a "second" field-structure frame is not missing, and the process moves to step 420, which continues by checking the status of the "frame missing" flag sent by application layer 12. That is, step 420 checks to see if the flag is "not set" (no frame is missing), or if the flag is "set" (frame missing). A decision is then made based on the status of the "frame missing" flag (step 425). If the "frame missing" flag is not set, no frames are missing in the current sequence, no error concealment is necessary, and the process continues in a conventional manner, with the new frame sent to step 430 for decoding (and then assembly in the proper display order, step 435).

Returning to step 425, if the determination is made that the "frame missing" flag has been set, then the process proceeds with checking the "structure" of the new frame (step 440). In particular, even if application layer 12 has "set" the "frame missing" flag, it is possible that this indicates the missing of a field-structure frame, which could be detected during the processing of subsequent frames. Therefore, step 440 checks the "structure" of the new frame and a decision is made at step 445 based on structure of the new frame. The decision at step 445 is phrased in this example as: "is the new frame a field-structure frame?". If the decision is "yes", then it is presumed that no frame is missing, error concealment is not required, and the new frame is sent to step 430 for decoding (and then assembly in the proper display order, step 435).

Figures 6, 7:
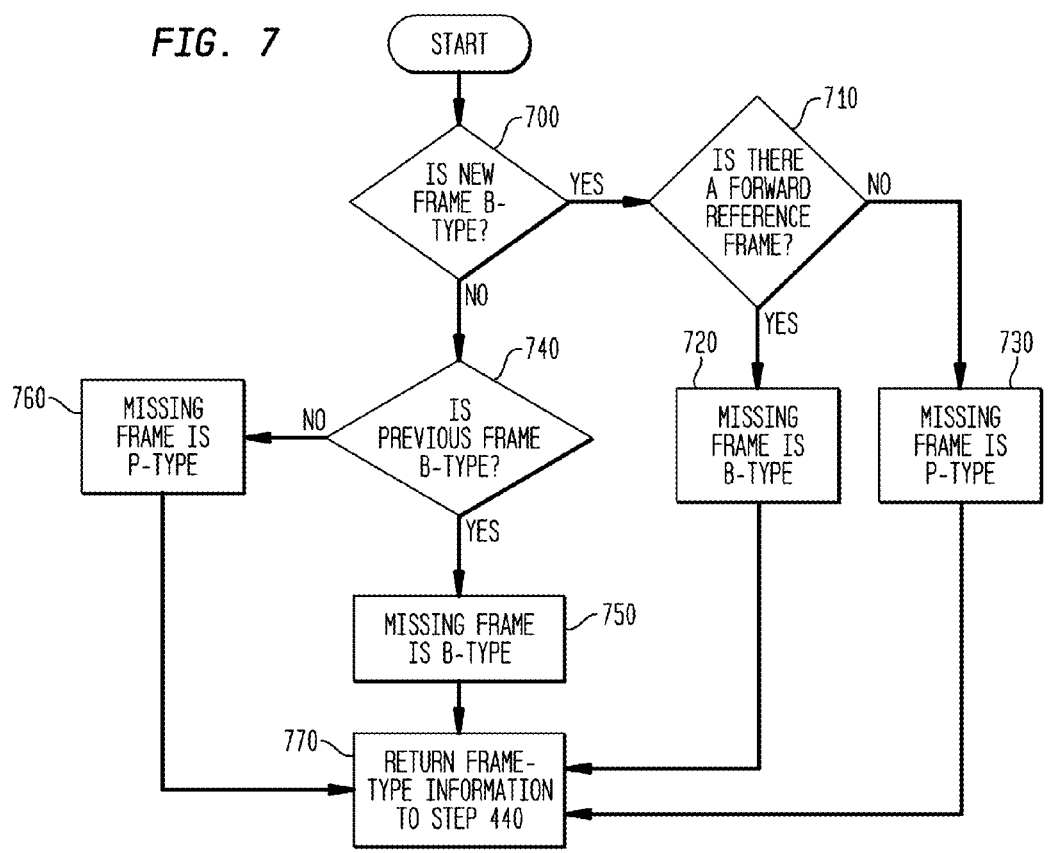
FIG. 6 is a decision rule table for determining the picture type of a missing frame, based on the picture type of the new frame and a previous frame.
FIG. 7 is a flowchart of an exemplary method of determining a picture type of a missing frame that may be used within the method shown in FIG. 4.

Alternatively, if the decision at step 445 is "no" (i.e., the new frame is a frame-structure frame), the process concludes that a frame is indeed missing between the previous frame and the new frame. The process then continues in accordance with this embodiment of the present invention by making a determination of the "picture type" of the missing frame (i.e., is the missing frame an I-type frame, a B-type frame, or a P-type frame), shown as step 450 in the flowchart of FIG. 4. An exemplary process for making this determination of picture type, based upon the available information, is shown in the flowchart of FIG. 6 and will be discussed below. It is to be noted that in one embodiment of the present invention, a missing frame is defined as being either a P-type frame or a B-type frame, since it is not considered appropriate to attempt to estimate the information contained within an I-type frame.

Once the "type" of the missing frame is determined (e.g., either a B-type or P-type frame), the process continues at step 455 with applying an error concealment process that is specific for the determined picture type. In one exemplary error concealment process, the missing frame is linked to a previously-decoded frame of the same picture type, with that previous frame copied and used as the "missing" frame. Other, more complicated schemes can be used in alternative embodiments of the present invention to create the missing frame, such as providing motion compensation to the previous frame of the same picture type, or using two previous frames of the same picture type to interpolate the information for the missing frame, or any other technique for creating missing frame information.

Finally, as shown in step 460, the process continues by adjusting the decoding logic, based on the frame parameters as now defined for the missing frame (that is, the defined "picture type" and "frame structure"). This adjustment is performed prior to decoding the new frame (within step 430, as shown). In particular, step 460 functions to re-build the decoding logic used by decoding layer 14 based on this additional information now defined for the missing frame.

To complete the discussion of the flowchart of FIG. 4, reference is again made to the decision at step 415. If, at this point, it is determined that the missing frame is indeed a "second" field-structure frame of a pair of field structure encoded frames (the process for making this determination will be explained in detail below in conjunction with the flowchart of FIG. 5), the process moves to step 465, which performs a field-structure frame error concealment process. One technique for error concealment in association with a missing field-structure frame is to duplicate the properly-received remaining field structure frame of the current pair of field structure frames. That is, if a "top-field" formatted field-structure frame is defined as "missing", an exemplary error concealment process may be to replicate each pixel line from the properly-received "bottom-field" formatted field-structure frame (see FIG. 3). Alternatively, the missing values can be interpolated from the values of the known pixel lines that appear "above" and "below" the missing pixel lines. Various other techniques for compensating for a missing field-structure frame may be used.

As with the steps outlined above for the frame-structure frame format, once the error concealment has taken place for the missing "second" field-structure frame, the process moves to step 460, which adjusts the decoding logic of the system so that the new frame may be properly decoded in the presence of this re-constituted "missing" field-structure frame.

Figure 5:
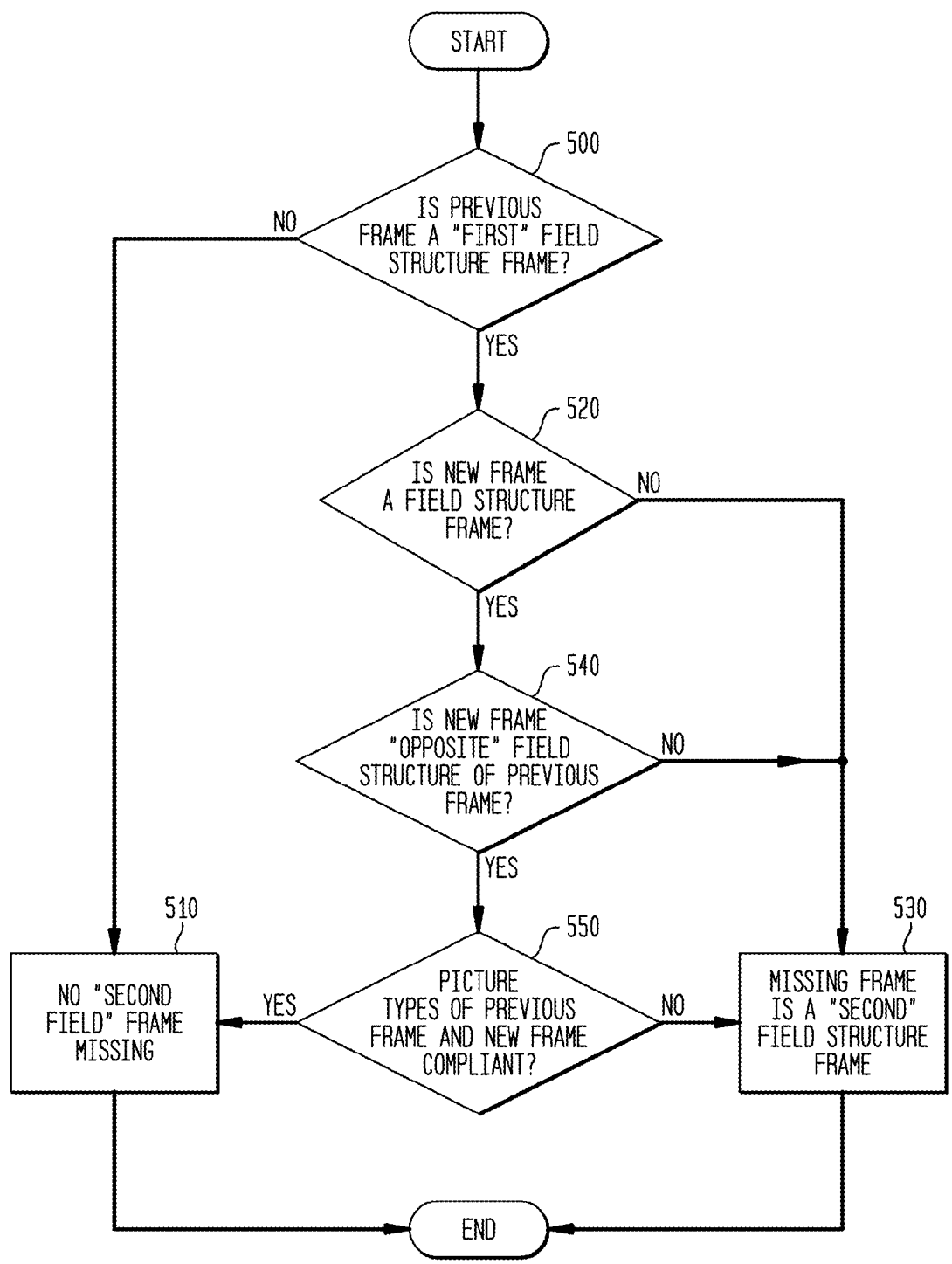
FIG. 5 is a flowchart of an exemplary method of determining a field structure of a missing frame that may be used within the method shown in FIG. 4.

FIG. 5 contains a flowchart of an exemplary process that may be used in conjunction with the methodology of the present invention to determine if a "second" field-structure frame in a pair of field-structure frames is missing. As noted above, this process is used at step 410 of the process as outlined in FIG. 4. As described below, the process of recognizing a missing field-structure frame is based on information that is known about the previous and new frames.

Looking at the specific process outlined in FIG. 5, it begins at step 500 by determining if the previous frame is a "first" field-structure frame. This determination is made by checking to see if the previous frame is either of the following possibilities: (a) a field-structure frame that followed a frame-structure frame, or (b) a field-structure frame that followed a proper pair of field-structure frames. If either of these alternatives matches the properties of the previous frame, then the previous frame is a "first" field-structure frame. Otherwise, it can be presumed that the previous frame is not a "first" field-structure frame.

Presuming that the outcome of decision step 500 is "no", the process moves to step 510, which declares that "no 'second' field-structure frame is missing", and returns this result to step 410. Otherwise, if the determination in step 500 is "yes"—that the previous frame is indeed a "first" field-structure frame—the process moves to decision step 520.

At this point, step 520 reviews the structure of the new frame (i.e., is the new frame a field-structure frame?). By presuming that the previous frame is a "first" field-structure frame, a determination of the structure of the new frame can be used to deduce the structure of the missing frame. For example, if the response to that query at step 520 is "no" (i.e., the new frame is a frame-structure frame), it can be presumed that the missing frame is indeed the "second" field-structure frame of the current pair (where the previous frame is the "first" field-structure claim of the pair). This declaration for the missing frame is defined as such at step 530 (which then returns this "second" field-structure designation as the missing frame structure information to step 410 of the process of FIG. 4).

If, instead, the result of decision point 520 is that the new frame is a field-structure frame (a "yes" output from step 520), the query continues at step 540 with determining if the new frame is opposite in format to the field-structure format of the previous frame (i.e., if the previous field-structure frame is identified as a "top-field" formatted frame, is the new frame a "bottom-field" formatted frame?). If they are not opposite in format, but of the same type (the response to step 540 then being "no"), then the previous frame and the new frame cannot form a "pair" of field-structure frames and it can again be presumed that the missing frame is a "second" field-structure frame to be paired with the previous frame, and the process again moves to step 530.

Otherwise, if the new frame has a field-structure opposite to that of the "first" field-structure of the previous frame, then the process continues by further checking the picture types of the previous frame and the new frame (step 550) to determine if they are compliant with each other. In one exemplary embodiment, this compliance includes the following situations: a) the previous frame is an I-type frame and the new frame is an I-type frame; b) the previous frame is an I-type frame and the new frame is a P-type frame; c) the previous frame is a B-type frame and the new frame is a B-type frame; or d) the previous frame is a P-type frame and the new frame is a P-type frame. In any of these situations, the two frames are defined as "compliant" and the process can then safely determine that there is no missing field-structure frame, moving to step 510 to send this "no second field missing" message back to step 410.

If none of the defined "compliant" picture type pairs is satisfied, then it can be presumed that a "second" field-structure frame is indeed missing, and the process again moves to step 530.

As mentioned before, the methodology of the present invention utilizes a set of queries to determine a "best guess" of the picture type of a missing frame, as implemented at step 450 in the flowchart of FIG. 4. In one case, a decision table is used to determine the best guess for the picture type of a missing frame structure. FIG. 6 illustrates an exemplary decision table that may be used for this purpose. As shown, the picture type of the missing frame is "guessed" in this case by looking at information associated with both the previously-decoded frame and the new frame being considered by the decoder. Inasmuch as there are three different picture types (I, B and P), there are a total of nine different decision cases. A flowchart as shown in FIG. 7 is considered to illustrate a process that may be used in conjunction with the decision table of FIG. 6 to select the picture type of the missing frame-structure frame. In each case, the picture type newly-arriving frame (referred to as the "new frame") is considered and compared with the known information of previous frames.

With reference to FIGS. 6 and 7, if the new frame is a B-type frame (a positive response to the query of step 700), the process begins the determination of the proper picture type of the missing frame by checking to see if there is a "forward reference" frame defined for this new B-type frame (step 710). If a previous frame has indeed been identified as a "forward reference" frame for the new B-type frame, then the missing frame is also a B-type frame picture (step 720). Otherwise, if there is no identified "forward reference" frame for the new B-type frame, then the missing frame is defined as a P-type frame for use as the backward reference frame of the new B-type frame (step 730).

Returning to step 700, if the new frame is not a B-type (i.e., it is either an I-type or P-type) frame, the next query reviews the "type" of the previous frame (step 740). If the previous frame is a B-type frame, it can be presumed that the missing frame is also a B-type frame (step 750). Similarly, if the new frame is an I-type frame and the previous frame is a B-type frame, the missing frame is presumed to be a B-type frame (again, step 750).

Alternatively, if the response to the query at step 740 is "no", and the previous frame is not a B-type frame, then it is presumed that the missing frame is a P-type frame (step 760). While the missing frame in this instance may also be a B-type frame, in the case of doubt, the definition of the missing frame as a P-type frame avoids later decoding problems. At the completion of each flow shown in FIG. 7, the definition of the picture type of the missing frame, as shown in step 770, is returned to step 440 in the flowchart of FIG. 4.

As mentioned above, in some implementations the MPEG-2 video data stream is a "progressive" format, which contains only frame-structure pictures. Performing frame-missing error concealment in this alternative embodiment of the present invention thus only needs to determine picture type of the missing frame to select the proper concealment process. FIG. 8 contains a flowchart illustrating an exemplary process that may be used to provide frame-missing error concealment in a progressive MPEG-2 video stream.

Referring to the flowchart of FIG. 8, this alternative embodiment of the present invention also begins with the decoder layer receiving both a new frame and a "frame-missing" flag from the application layer (step 800). The process continues by first parsing the header information of the new frame (step 802) to retrieve its picture type and frame structure information, and then checking the status of the "frame missing" flag at step 805. As before, if the "frame-missing" flag is not set (a "no" decision output from step 805), then the decoding process of the new frame continues in a conventional manner (step 810), followed by re-ordering of the decoded frames into the proper display order (step 815).

Returning to step 805, if the "frame-missing" flag is set, (a "yes" decision output), then the process proceeds to determine the "best guess" of the picture type of the missing frame, based on the picture types of the previous frame and the new frame. In one case, the same process as outlined above in FIG. 6 can be used for this purpose. Alternatively, this decision process can be somewhat simplified, where an exemplary simplified process is shown in FIG. 8.

Referring to FIG. 6, if it is presumed that a forward reference frame is missing in each instance of the new frame being a B-type picture (cases 4, 5 and 6), then the missing frame is "guessed" as being a P-type frame (as shown in the final column of FIG. 6). Using this presumption, therefore, the missing frame is "guessed" as being a B-type frame if and only if the previous frame is a B-type frame and the new frame is not a B-type frame (shown as cases 2 and 8 in the table of FIG. 6). In every other instance, the missing frame is defined as being a P-type frame. Again, as mentioned above, erring on the side of declaring the picture type of a missing frame as a P-type frame is acceptable and causes minimal problems in subsequent decoding operations.

The remaining steps as outlined in FIG. 8 implement this simplified logic. In particular, the process is shown to continue at step 820 with a decision based on the picture type of the previous frame. In this particular arrangement, the query takes the form of: "is the previous frame a B-type frame?" If the answer to this query is "no", then it can be concluded that the missing frame is a P-type frame, as shown in step 825 (applying the simplified logic outlined above). Following this determination, an error concealment technique is applied that is particular to this picture type determination (step 830). As mentioned above, one exemplary error concealment technique is to link the missing frame to a previous P-type frame and replicate the previous P-type frame (or, alternatively, use more than one previous frame and perform an averaging process).

In any case, once an error concealment process has been applied to the missing frame, the process continues at step 835 by adjusting the decision logic, as necessary, to accommodate the information associated with the missing frame. Once the necessary adjustments in the decision logic have been made, the process moves to step 810 to begin the process of decoding the new frame.

Returning to step 820, if the answer to the query at this is "yes" (that is, the previous frame is a B-type frame), the process continues with a query regarding the picture type of the new frame (step 840). In this particular example, the query takes the form of: "is the new frame a B-type frame"?. If the response to this query is "yes" and, applying the logic explained above, it is concluded that the missing frame is a P-type frame (step 825), and the process steps 830 and 835 are followed, as outlined above.

Alternatively, returning to the decision at step 840, if it is determined that the new frame is not a B-type frame (i.e., either case 2 or case 8 in FIG. 6), then the decision is made that the missing frame is a B-type frame (step 845). An error concealment process suitable for a B-type frame is utilized (step 850), with the process then moving to step 835 to adjust the decoding logic. Again, error concealment can be performed by searching for the most recent B-type frame and duplicating the data contents of that frame for the missing frame.

Regardless of the ability to properly "guess" the type and structure of a missing frame, the encoded video data itself will remain missing. The process of the present invention is not intended to recover the missing data, but instead to improve the overall performance of the decoder by concealing the occurrence of a missing frame in the best manner possible by at least including best guesses of the picture header information in terms of picture type and frame structure to assist in re-establishing the decoding logic.

Figure 9:
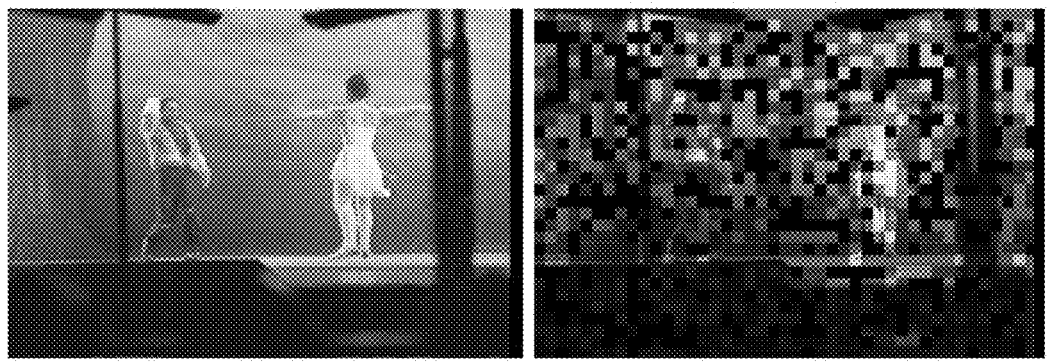
FIG. 9 contains a comparison of "first" frames in a stream where a "frame missing" event has occurred, the left-hand frame utilizing error concealment in accordance with the present invention, and the right-hand frame ignoring the "frame missing" event.
Figure 10:
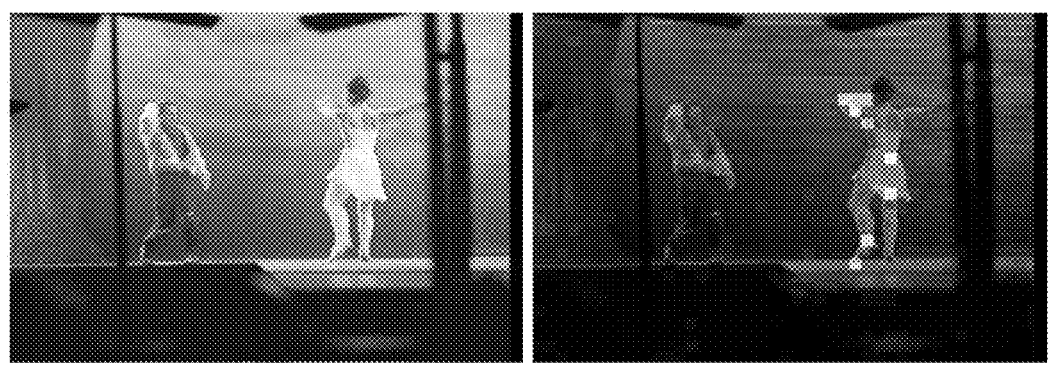
FIG. 10 contains a comparison of the "second" frames from the same stream as shown in FIG. 9.
Figure 11:
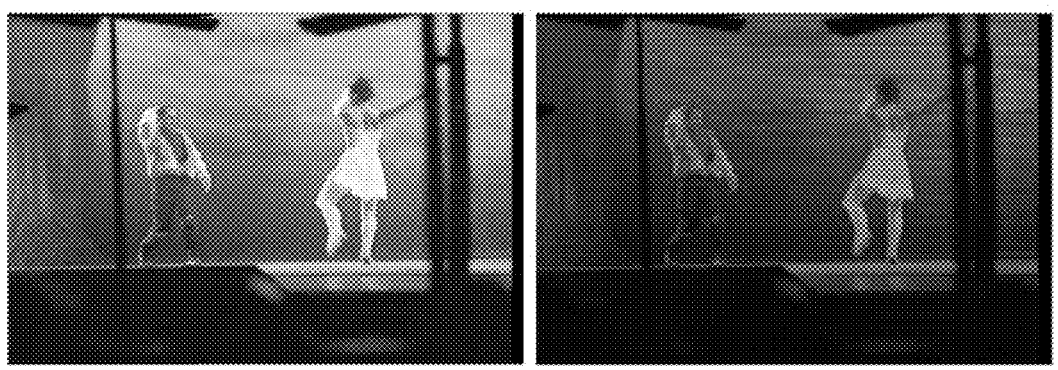
FIG. 11 contains a comparison of the "third" frames from this stream.

Example results from implementing the error concealment process of the present invention are shown in FIGS. 9-11 and 12-13. FIGS. 9-11 are a comparison of three sequential frames where a field-structure frame has been declared missed. The left-hand column of frames in FIGS. 9-11 were decoded using the process of the present invention, while the right-hand column of frames in FIGS. 9-11 were decoded without recognizing a "missing frame" occurrence. In this example, the decoder outputs are compared side-by-side with and without using the concealment process of the present invention.

FIG. 9 is a comparison (in the display order) of a first B-type frame of a field-structure frame, which uses a "missing field" from the third I frame (FIG. 11) as a reference. Similarly, FIG. 10 shows the next frame in the display order, which is also a B-type frame and also uses the "missing field" information from the third I frame (FIG. 11) as a reference. FIG. 11 is a comparison of the third frame in the display order, which is an I-type picture and is missing one of the fields. By detecting the "missing field" and concealing it using the methodology of the present invention, the picture quality of all three frames (as shown in the left-hand portions of FIGS. 9-11) is significantly improved. When error concealment is not utilized, as shown in the right-hand pictures of FIGS. 9-11, the artifacts associated with the missing field are obvious.

Figure 12:
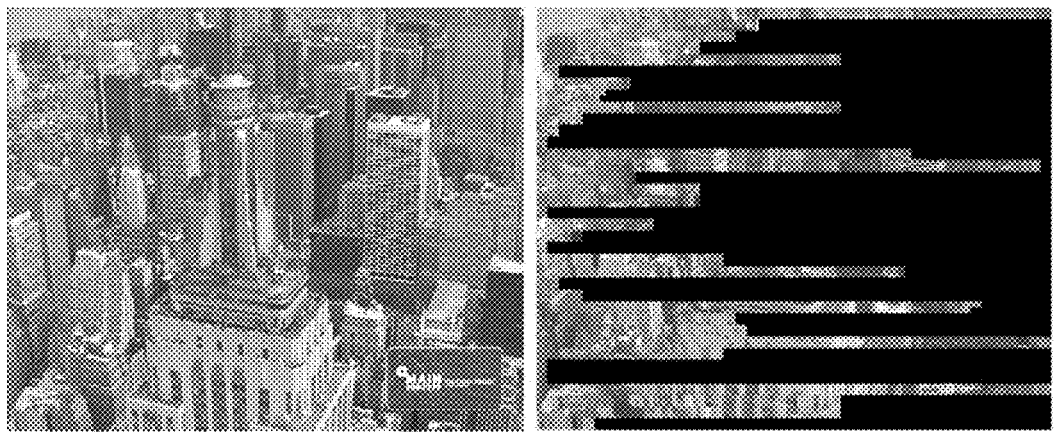
FIG. 12 contains a comparison of "first" frames in a stream where a forward reference frame is missing, the left-hand frame utilizing error concealment in accordance with the present invention, and the right-hand frame ignoring the "frame missing" event.
Figure 13:
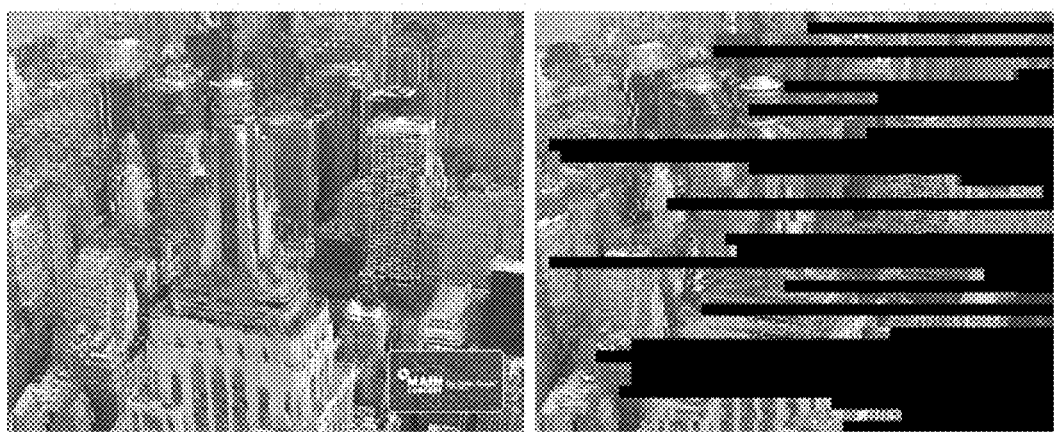
FIG. 13 contains a comparison of the "second" frames from the same stream as used in FIG. 12.

In the example of FIGS. 12 and 13, a forward reference frame-structure frame is declared as missing. Again, the decoder outputs are compared side-by-side in display order, with the left-hand frames of FIGS. 12 and 13 illustrating the improvement in results by using error concealment in accordance with the present invention. In FIG. 12, the left-hand frame is (properly) defined as an I-type frame. In the right-hand side, the initial frame is mis-identified as a B-type frame (as a result of wrong display order from the missing forward reference frame, where the decoder improperly used the forward reference I-type frame as a backward reference frame). FIG. 13 shows the following frame, which for the left-hand side is the proper first B-type frame following the I-type frame. However, the right-hand side of FIG. 13 is a second B-type picture, continuing with the propagation of the initial error within an incorrect decoding logic.

Although artifacts caused by missing a reference picture can still be observed in the left-hand frame of FIG. 13 where error concealment has been applied, the methodology of the present invention preserves the picture quality to a much better extent than without using the any frame-missing error concealment process. Additionally, more complicated types of concealment, such as using motion compensation and other interpolation techniques as mentioned above, can be utilized to rebuild the missing frame data and further reduce the artifacts.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention.

Indeed, the present invention can take the form of a processor for decoding MPEG-2-encoded frames that is configured to include an application layer and a decoder layer that are used in conjunction to "flag" the possibility of a missing frame and then determining parameters (picture type and frame structure) associated with the missing frame.

The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method of concealing errors attributed to missing frames in a Motion Picture Expert Group-2 video stream, the method comprising the steps of:

receiving, in a video decoder, a frame for decoding and a "frame missing" flag that is set to a value associated with the occurrence of a missing frame;

parsing the received frame to recover a picture type and a frame structure of the received frame;

retrieving a picture type and a frame structure of a previous frame decoded immediately prior to the received frame, wherein the picture type information for the previous frame and the received frame includes I-type, B-type and P-type frames, and the frame structure is selected between a field-structure format and a frame-structure format;

assigning a picture type and a frame structure to the missing frame based on the picture type and frame structure values of the previous frame and the received frame, wherein the picture type information assigned to the missing frame is selected between a P-type frame and a B-type frame, and the frame structure assigned to the missing frame is selected between the field-structure format and the frame-structure format, wherein, in response to selecting the field-structure, the missing frame is further defined to be a second field-structure frame of a pair of field-structure format frames in response to:

the previous frame being a first field-structure frame and the received frame being a frame-structure frame; or the received frame being a field-structure frame is of a same top-field or bottom-field format as a previous first field-structure frame; or the received frame is a field-structure frame with a picture type that is not compliant with the picture type of the previous frame which is a first field-structure frame; and applying an error concealment technique based upon the assigned picture type and frame structure of the missing frame, wherein applying the error concealment technique comprises applying a first error concealment technique in response to the missing frame having the field-structure format, and applying a second error concealment technique in response to the missing frame having a frame-structure format, and wherein the first error concealment technique is a function of whether the missing frame is a first or second frame of a pair of field-structure format frames.

2. The method as defined in claim 1 wherein the step of applying an error concealment technique to a frame-structure missing frame is based upon using at least one prior frame of the same picture type.

3. The method as defined in claim 2 wherein the step of applying an error concealment technique recreates a missing frame by duplicating a prior frame of the same picture type for use as the missing frame.

4. The method as defined in claim 1 wherein the step of applying an error concealment technique to a field-structure missing frame is based upon using a properly-received remaining field-structure frame of a pair of field-structure frames.

5. The method as defined in claim 4 wherein the error concealment technique repeats each pixel line of the properly-received remaining field-structure frame as a pixel line for the field-structure missing frame.

6. The method as defined in claim 4 wherein the error concealment technique interpolates between adjacent pixel lines of the properly-received remaining field-structure frame to create a pixel line for the field-structure missing frame.

7. The method as defined in claim 1 wherein in response to the missing frame being defined as a frame-structure frame, the missing frame is assigned a B-type picture type only if the previous frame is a B-type picture type and the received frame is not a B-type picture type, otherwise, the missing frame is assigned a P-type picture type.

8. A video receiver for receiving Motion Picture Expert Group-2 encoded frames and recreating a video stream therefrom, the video receiver configured to apply an error concealment technique in the presence of missing Motion Picture Expert Group-2 frames, video receiving including a processor comprising:

an application layer for receiving transport stream packets of Motion Picture Expert Group-2 encoded video and re-ordering the received packets into a frame, the application layer for recognizing missing packets during the re-ordering and making a determination to discard the re-ordered frame if the missing packets contain information required for decoding video data, the application layer then setting a "frame missing" flag upon discarding; and a decoder layer for receiving the re-ordered frame and the "frame missing" flag from the application layer and using the "frame missing" flag in conjunction with parameters of previous frames to perform error concealment upon recognition of a discarded frame, wherein the decoder layer of the processor is configured to:

parse the re-ordered frame to recover a picture type and a frame structure of the re-ordered frame;

retrieve a picture type and a frame structure of a previous frame decoded immediately prior to the re-ordered frame, wherein the picture type information for the previous frame and the received frame includes I-type, B-type and P-type frames, and the frame structure is selected between a field-structure format and a frame-structure format;

assign a picture type and a frame structure to the missing frame, wherein the picture type information assigned to the missing frame is selected between a P-type frame and a B-type frame, and the frame structure assigned to the missing frame is selected between the field-structure format and the frame-structure format, wherein, in response to selecting the field structure format, the missing frame is to be further defined as a second field-structure frame of a pair of field-structure format frames in response to:

the previous frame being a first field structure frame and the received frame being a frame-structure frame; or the received frame being a field structure frame is of a same top-field or bottom-field format as a previous first field-structure frame; or the received frame is a field structure frame with a picture type that is not compliant with the picture type of the previous frame which is a first field-structure frame; and apply an error concealment technique based upon the assigned picture type and frame structure, wherein the error concealment technique comprises application of a first error concealment technique in response to the missing frame having the field-structure format, and application of a second error concealment technique in response to the missing frame having a frame-structure format, and wherein the first error concealment technique is a function of whether the missing frame is a first or second frame of a pair of field-structure format frames.

9. A method of decoding a received transport stream of Motion Picture Expert Group-2 packets and concealing errors attributed to discarded frames based on missing packets, the method comprising the steps of:

receiving, at an application layer of a video receiver, Motion Picture Expert Group-2 transport stream packets;

re-ordering the received transport stream packets to create a Motion Picture Expert Group-2 frame; searching the re-ordered packets to detect a missing packet;

determining if the missing packet is necessary to perform decoding of the frame and, if not, sending the frame to a decoder layer for decompressing the video data, otherwise, discarding the frame, setting a "frame missing flag", and repeating the above steps on a following frame, then sending the following frame and the "frame missing" flag to the decoder layer and performing frame concealment for the missing frame by:

parsing the following frame to recover a picture type and a frame structure of the following frame;

retrieving a picture type and a frame structure of a previous frame decoded immediately prior to the following frame, wherein the picture type information for the previous frame and the received frame includes I-type, B-type and P-type frames, and the frame structure is selected between a field-structure format and a frame-structure format;

assigning a picture type and a frame structure to the missing frame based on the picture type and frame-structure values of the previous frame and the following frame, wherein the picture type information assigned to the missing frame is selected between a P-type frame and a B-type frame, and the frame structure assigned to the missing frame is selected between the field-structure format and the frame-structure format, wherein, in response to selecting the field-structure, the missing frame is further defined to be a second field-structure frame of a pair of field-structure format frames in response to:

the previous frame being a first field-structure frame and the received frame being a frame-structure frame; or the received frame being a field-structure frame is of a same top-field or bottom-field format as a previous first field-structure frame; or the received frame is a field-structure frame with a picture type that is not compliant with the picture type of the previous frame which is a first field-structure frame; and applying an error concealment technique based upon the assigned picture type and frame structure of the missing frame, wherein applying the error concealment technique comprises applying a first error concealment technique in response to the missing frame having the field-structure format, and applying a second error concealment technique in response to the missing frame having a frame-structure format, and wherein the first error concealment technique is a function of whether the missing frame is a first or second frame of a pair of field-structure format frames.

10. The method as defined in claim 9 wherein the missing packet is defined as including information necessary to perform decoding of the frame if the missing packet comprises at least a portion of the picture header of the frame.

11. The method as defined in claim 9 wherein the error concealment technique is based upon using at least one previous frame having the same picture type and frame structure as assigned to the missing frame.

* * * * *